US012373207B2

(12) United States Patent
Kotra et al.

(10) Patent No.: US 12,373,207 B2
(45) Date of Patent: *Jul. 29, 2025

(54) IMPLEMENTING A MICRO-OPERATION CACHE WITH COMPACTION

(71) Applicant: Advanced Micro Devices, Inc., Santa Clara, CA (US)

(72) Inventors: Jagadish B. Kotra, Austin, TX (US); John Kalamatianos, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/325,067

(22) Filed: May 19, 2021

(65) Prior Publication Data

US 2021/0279054 A1  Sep. 9, 2021

Related U.S. Application Data

(63) Continuation of application No. 16/297,358, filed on Mar. 8, 2019, now Pat. No. 11,016,763.

(51) Int. Cl.
*G06F 9/38* (2018.01)
*G06F 9/22* (2006.01)
(Continued)

(52) U.S. Cl.
CPC ............ *G06F 9/223* (2013.01); *G06F 9/3016* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| 4,021,779 A | 5/1977 | Gardner |
| 4,455,604 A | 6/1984 | Ahlstrom et al. |

(Continued)

FOREIGN PATENT DOCUMENTS

| EP | 0098494 A2 | 1/1984 |
| EP | 0178671 A2 | 4/1986 |

OTHER PUBLICATIONS

International Search Report and Written Opinion in International Application No. PCT/US2008/08802, dated Oct. 6, 2008, 14 pages.

(Continued)

*Primary Examiner* — Michael Sun
(74) *Attorney, Agent, or Firm* — Kowert, Hood, Munyon, Rankin & Goetzel, P.C.; Rory D. Rankin

(57) ABSTRACT

Systems, apparatuses, and methods for compacting multiple groups of micro-operations into individual cache lines of a micro-operation cache are disclosed. A processor includes at least a decode unit and a micro-operation cache. When a new group of micro-operations is decoded and ready to be written to the micro-operation cache, the micro-operation cache determines which set is targeted by the new group of micro-operations. If there is a way in this set that can store the new group without evicting any existing group already stored in the way, then the new group is stored into the way with the existing group(s) of micro-operations. Metadata is then updated to indicate that the new group of micro-operations has been written to the way. Additionally, the micro-operation cache manages eviction and replacement policy at the granularity of micro-operation groups rather than at the granularity of cache lines.

20 Claims, 7 Drawing Sheets

(51) Int. Cl.
    *G06F 9/30*       (2018.01)
    *G06F 12/0875*    (2016.01)

(56) References Cited

U.S. PATENT DOCUMENTS

| | | | |
|---|---|---|---|
| 4,498,132 A | 2/1985 | Ahlstrom et al. | |
| 4,642,757 A | 2/1987 | Sakamoto | |
| 4,901,235 A | 2/1990 | Vora et al. | |
| 5,036,453 A | 7/1991 | Renner et al. | |
| 5,574,927 A | 11/1996 | Scantlin | |
| 5,649,112 A | 7/1997 | Yeager et al. | |
| 5,671,356 A | 9/1997 | Wang | |
| 5,796,972 A | 8/1998 | Johnson et al. | |
| 5,845,102 A | 12/1998 | Miller et al. | |
| 6,141,740 A | 10/2000 | Mahalingaiah et al. | |
| 7,095,342 B1 | 8/2006 | Hum et al. | |
| 7,165,169 B2 | 1/2007 | Henry et al. | |
| 7,734,873 B2 | 6/2010 | Lauterbach et al. | |
| 7,743,232 B2 | 6/2010 | Shen et al. | |
| 8,195,886 B2 * | 6/2012 | Ozer | G06F 12/126 711/E12.075 |
| 8,370,609 B1 | 2/2013 | Favor et al. | |
| 8,782,374 B2 | 7/2014 | Rappoport et al. | |
| 9,244,686 B2 | 1/2016 | Henry et al. | |
| 9,262,327 B2 * | 2/2016 | Steely, Jr. | G06F 12/0862 |
| 10,719,447 B2 * | 7/2020 | Akenine-Moller | G06F 12/0875 |
| 11,016,763 B2 | 5/2021 | Kotra et al. | |
| 11,681,620 B2 * | 6/2023 | Scrbak | G06F 12/121 711/105 |
| 2006/0010310 A1 | 1/2006 | Bean et al. | |
| 2007/0083735 A1 | 4/2007 | Glew | |
| 2010/0235576 A1 * | 9/2010 | Guthrie | G06F 12/127 711/146 |
| 2012/0260066 A1 | 10/2012 | Henry et al. | |
| 2013/0024647 A1 * | 1/2013 | Gove | G06F 12/084 711/207 |
| 2016/0283391 A1 * | 9/2016 | Nilsson | G06F 12/0804 |
| 2017/0278215 A1 * | 9/2017 | Appu | G06T 1/60 |
| 2017/0286110 A1 * | 10/2017 | Agron | G06F 9/30145 |
| 2018/0095753 A1 | 4/2018 | Bai et al. | |
| 2019/0042453 A1 * | 2/2019 | Basak | G06F 12/128 |
| 2020/0019406 A1 | 1/2020 | Kalamatianos et al. | |

OTHER PUBLICATIONS

Rice et al. "A Formal Model for SIMD Computation", Proceedings., 2nd Symposium on the Frontiers of Massively Parallel Computation, Oct. 1988, pp. 601-607.

\* cited by examiner

IMPLEMENTING A MICRO-OPERATION CACHE WITH COMPACTION

CROSS REFERENCE TO RELATED APPLICATIONS

This application is a continuation of U.S. patent application Ser. No. 16/297,358, entitled "IMPLEMENTING A MICRO-OPERATION CACHE WITH COMPACTION", Mar. 8, 2019, the entirety of which is incorporated herein by reference.

GOVERNMENT LICENSE RIGHTS

This invention was made with Government support under the PathForward Project with Lawrence Livermore National Security, Prime Contract No. DE-AC52-07NA27344, Subcontract No. B620717 awarded by the United States Department of Energy. The United States Government has certain rights in this invention.

BACKGROUND

Description of the Related Art

When executing an instruction stream, central processing unit (CPU) cores fetch instructions and decode the instructions into micro-operations. It is noted that micro-operations can also be referred to herein as "micro-operations" or "uops". The micro-operations are then supplied to the CPU back-end for execution. Modern CPU cores use a micro-operation cache to reduce the number of times instructions have to be decoded. Reducing the number of times instructions have to be decoded helps to decrease power consumption and reduce the branch misprediction penalty due to a reduction in decoder latency. The benefits of this approach depend on the instruction working set size and the size of the micro-operation cache. When newly decoded micro-operations need to be stored and the micro-operation cache is full, one or more micro-operation cache entries are evicted and the micro-operations from these entries are discarded. Subsequent requests for the same addresses fetch instructions to be decoded again into micro-operations. One solution to reduce usage of the decode unit is to increase the size of the micro-operation cache so that the hit rate is higher. However, increasing the micro-operation cache might not be a viable solution if it disrupts the floorplan of the CPU core and worsens timing related critical paths. Additionally, increased micro-operation cache size will also increase the static power that is consumed. In addition, it may not be possible to increase the micro-operation cache size if there are area limitations.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
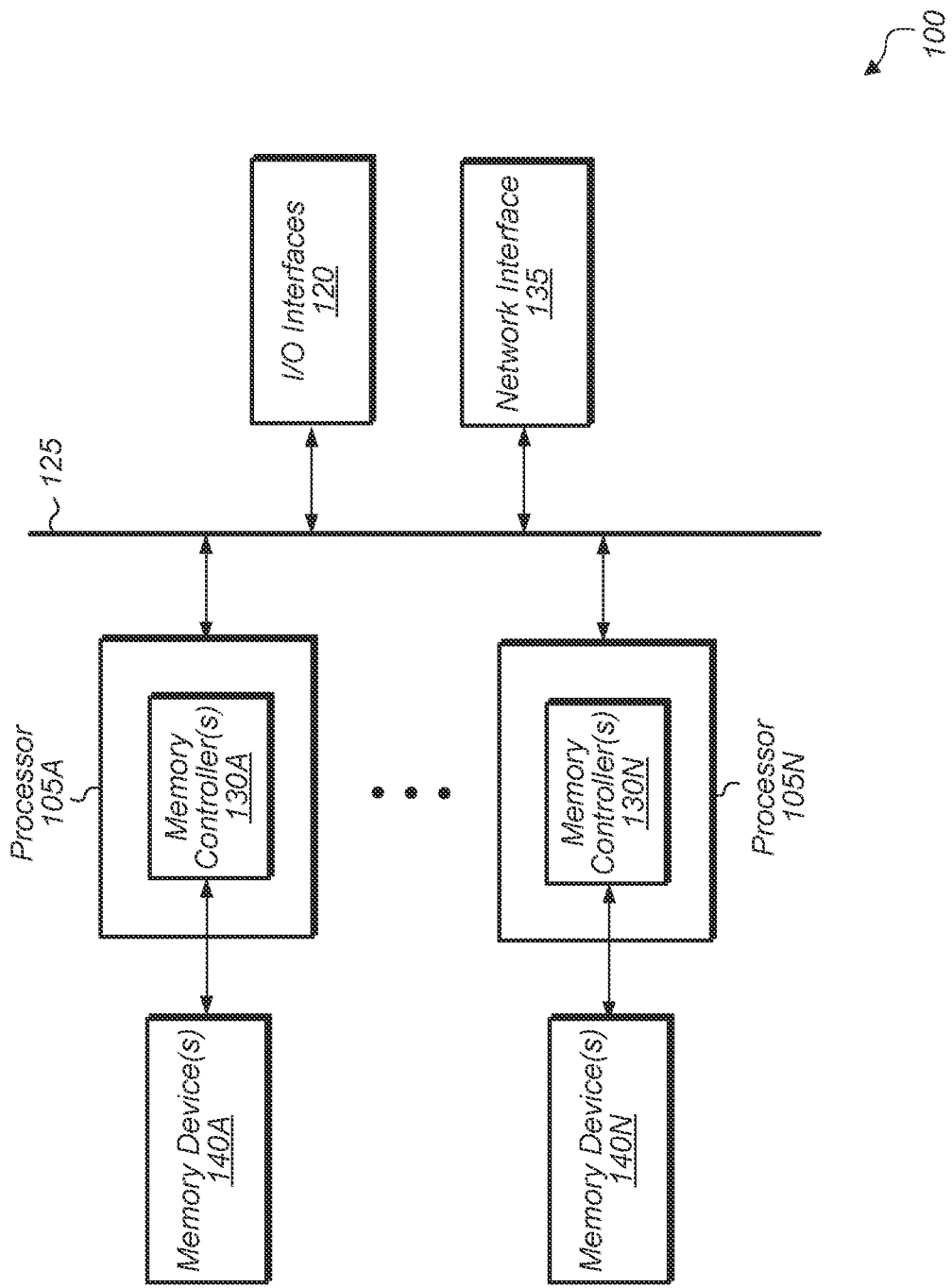
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for compacting multiple groups of micro-operations into individual cache lines of a micro-operation cache are disclosed herein. In one implementation, a system includes at least one or more processors coupled to one or more memory devices. At least one processor includes a processor pipeline with various pipeline stages. These stages include at least a fetch unit and a decode unit. The processor pipeline also includes a conventional cache subsystem, a micro-operation cache, and a control unit with logic for managing micro-operations. The micro-operation cache stores micro-operations that have already been decoded by the decode unit for instructions retrieved by the fetch unit. In one implementation, the conventional cache subsystem includes a level one (L1) cache for storing instructions.

In various implementations, the decode unit decodes instructions into micro-operations which are then stored in the micro-operation cache. In one implementation, the micro-operation cache is an N-way set associative cache, where N is a positive integer. As part of the decoding process, the decode unit partitions an instruction stream into groups of micro-operations. When a new group of micro-operations is decoded and ready to be written to the micro-operation cache, the micro-operation cache determines which set is targeted by the new group of micro-operations. If there is a way in this set that can store the new group without evicting an existing group already stored in the way, then the new group is compacted into the way with the existing group(s) of micro-operations such that both the new group and the existing group(s) are stored together. Metadata is then updated to indicate that the new group of micro-operations has been written to this particular way. Additionally, the micro-operation cache manages eviction and replacement policy at the granularity of micro-operation groups rather than at the granularity of cache lines.

Micro-operation cache compaction can increase the micro-operation cache hit rate and in the case of a virtualized micro-operation cache, compaction can increase the L1 instruction cache hit rate for virtualized lines (i.e., lines with micro-operations stored in the L1 instruction cache). A higher micro-operation cache hit rate lowers energy consumption because the original instructions do not need to be decoded again. In the case of a virtualized micro-operation cache, there is additional energy savings by reducing the extra misses that would have otherwise occurred if micro-operations were not stored in the L1 instruction cache.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components (e.g., display controller) and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, there can be more or fewer of each component than the number shown in FIG. 1. It is also noted that computing system 100 can include other components not shown in FIG. 1. Additionally, in other implementations, computing system 100 can be structured in other ways than shown in FIG. 1.

Figure 2:
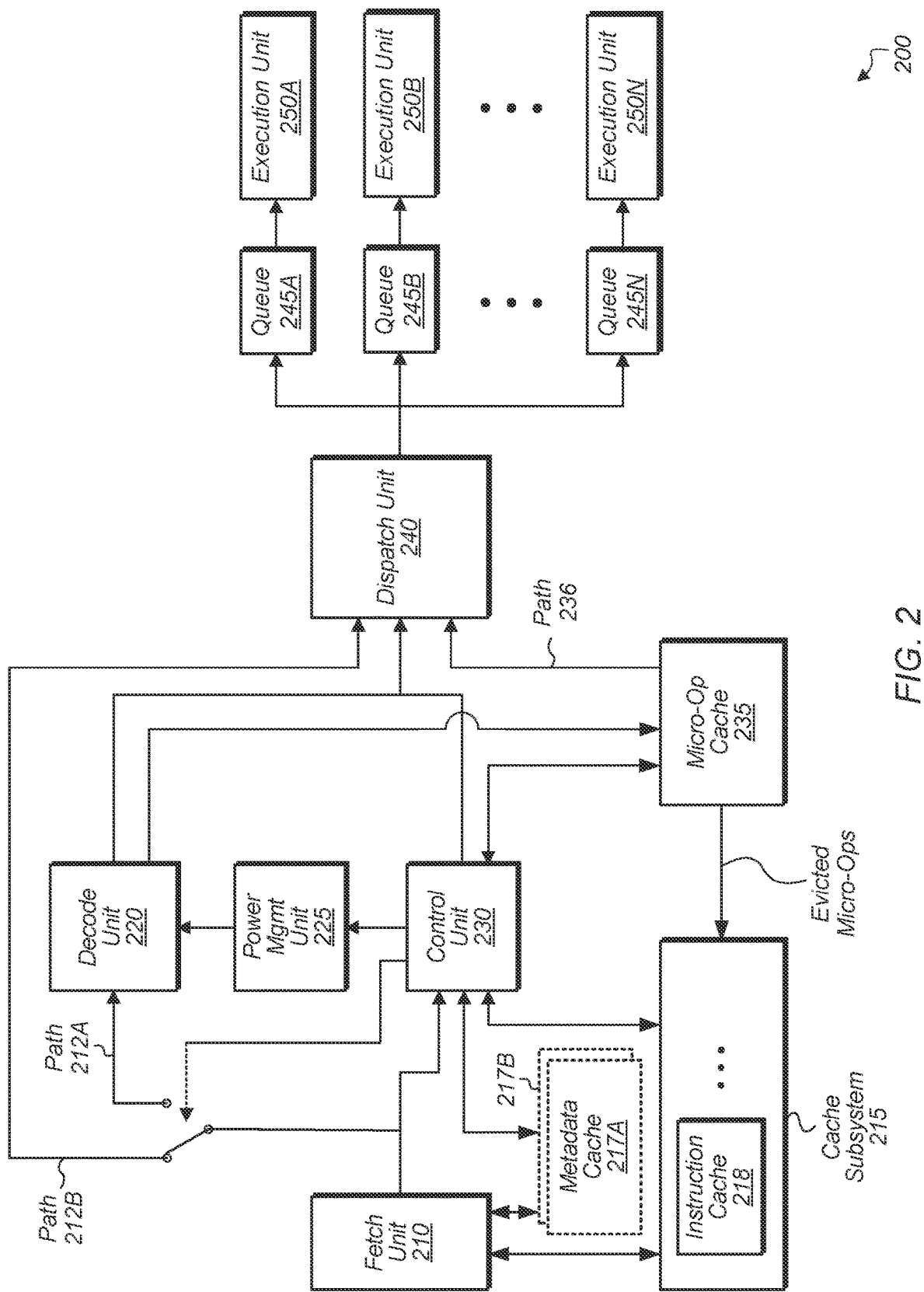
FIG. 2 is a block diagram of one implementation of a processor pipeline.

Turning now to FIG. 2, a block diagram of one implementation of a processor pipeline 200 is shown. In various implementations, processors 105A-N (of FIG. 1) include one or more instantiations of processor pipeline 200. In one implementation, processor pipeline 200 includes at least fetch unit 210, cache subsystem 215, metadata cache 217A-B, decode unit 220, power management (mgmt) unit 225, control unit 230, micro-operation cache 235 ("micro-op cache 235" in FIG. 2), dispatch unit 240, queues 245A-N, and execution units 250A-N. It is noted that while in some implementations, processor pipeline 200 supports micro-operation cache virtualization and includes metadata cache 217A-B, in other implementations, processor pipeline 200 does not support micro-operation cache virtualization and metadata cache 217A-B is omitted. It should be understood that processor pipeline 200 also includes other components (e.g., branch prediction unit) which are not shown to avoid obscuring the figure. In other implementations, processor pipeline 200 includes other components and/or is structured in other suitable manners.

Generally speaking, the operation of processor pipeline 200 involves fetch unit 210 fetching instructions, decode unit 220 decoding instructions into micro-operations, and dispatch unit 240 assigning the micro-operations to queues 245A-N. As shown in processor pipeline 200, each queue 245A-N is coupled to a corresponding execution unit 250A-N. However, in other implementations, one or more queues 245A-N are coupled to multiple execution units 250A-N. When the dependencies are resolved and the micro-operations are ready to execute, pickers (not shown) will pick the micro-operations out of queues 245A-N to execute on the execution units 250A-N.

In one implementation, fetch unit 210 fetches instructions of a program stream from memory and/or an instruction cache 218 within cache subsystem 215. While cache subsystem 215 is shown as including instruction cache 218, it is noted that cache subsystem 215 can also include a level two (L2) cache, a level three (L3) cache, and potentially other caches in various implementations. In one implementation, fetch unit 210 performs parallel lookups to micro-operation cache 235 and cache subsystem 215 for the fetch address of a given instruction in the program stream. If there is a hit on the micro-operation cache 235, then the micro-operations are used via path 236. If, on the other hand, the instruction cache 218 stores the instructions, then the instructions are conveyed to the decode unit 220 using path 212A. In some embodiments that support micro-operation cache virtualization, a determination is made as to whether the instruction cache 218 stores the instructions or micro-operations corresponding to the fetch address. Metadata stored in a metadata cache 217 or another structure indicates that the instruction cache 218 is currently storing micro-operations. In one implementation, if there is an entry in metadata cache 217 for a given instruction, then this indicates that the corresponding entry in cache subsystem 215 stores micro-operations. Otherwise, if there is not an entry in metadata cache 217 for a given instruction, then it is assumed that the corresponding line in cache subsystem 215 stores instructions. If the instruction cache 218 stores micro-operations, then the micro-operations are used and decode unit 220 is bypassed using path 212B.

In one implementation, if the micro-operations are not available in either cache subsystem 215 or micro-operation cache 235, then fetch unit 210 conveys the fetched instructions on path 212A to decode unit 220. Decode unit 220 decodes the fetched instructions into micro-operations. Generally, a micro-operation is an operation that the hardware included in execution units 250A-N is capable of executing. In various implementations, each instruction translates to one or more micro-operations which, when executed, result in the performance of the operations defined for that instruction according to the instruction set architecture. Any type of instruction set architecture (e.g., x86) is employed by processor pipeline 200.

Decode unit 220 identifies the type of instructions, source operands, etc., and each decoded micro-operation includes the instruction along with some of the decode information. In implementations in which each instruction translates to a single micro-operation, each micro-operation is the corresponding instruction or a portion thereof (e.g., the opcode field or fields of the instruction). In some implementations, decode unit 220 includes any combination of circuitry and/or microcode for generating micro-operations from instructions. For example, in one implementation, relatively simple micro-operation generations (e.g., one or two micro-operations per instruction) are handled in hardware while more extensive micro-operation generations (e.g., more than three micro-operations for an instruction) are handled in microcode.

In one implementation, when decode unit 220 decodes an instruction into one or more micro-operations, the micro-operations are combined into a micro-operation group and conveyed to micro-operation cache 235. Decode unit 220 terminates a current group of micro-operations and creates a new group of micro-operations when a termination condition is reached for the current group of micro-operations. In one implementation, a termination condition is reached if the instruction being decoded is a predicted taken branch, if the number of micro-operations in the current group reaches a threshold, or if the number of immediate or displacement fields in the current group reaches a threshold. In other implementations, decode unit 220 uses other termination conditions.

When a termination condition is detected, decode unit 220 sends the current group of micro-operations to micro-operation cache 235. Micro-operation cache 235 includes any type and capacity of cache structure for storing micro-operations from recently decoded instructions. Typically, micro-operation cache 235 only has a storage capacity to store a portion of the micro-operations for decoded instructions being executed by processor pipeline 200. Accordingly, in order to more efficiently utilize the storage capacity of micro-operation cache 235, compaction of micro-operation groups is supported in micro-operation cache 235.

In one implementation, micro-operation cache 235 supports compaction by opportunistically compacting multiple groups of micro-operations together into a single micro-operation cache line. Micro-operation compaction is accomplished by identifying groups of micro-operations that can fit in a single micro-operation cache line and then storing them in the same micro-operation cache line. In an implementation where compaction is not supported, these groups of micro-operations would be stored in multiple different micro-operation cache lines. In one implementation, multiple groups of micro-operations can be compacted together (i.e., stored together) if each group of the multiple groups is mapped to the same micro-operation cache set.

The opportunity for compaction arises from the existence of several constraints on terminating the micro-operation groups. In one implementation, such constraints include (1) taken branches in the code stream, (2) number of micro-operations per micro-operation cache entry, and (3) number of immediate/displacement values per micro-operation cache entry. Such constraints fracture the code stream and generate a lot of small groups of micro-operations. If each group of micro-operations is stored in a separate micro-operation cache line, this puts pressure on the size of the micro-operation cache and triggers additional micro-operation cache misses. To mitigate these shortcomings of a fractured code stream, in one implementation, up to N groups of micro-operations are allowed to be stored in the same micro-operation cache line, where N is a positive integer, and where the value of N can vary according to the implementation.

Depending on the implementation, the micro-operation cache 235 maintains replacement state per way or replacement state per micro-operation group. In the case when the micro-operation cache 235 maintains replacement state per way, the replacement policy involves selecting the micro-operation cache way to be evicted. The micro-operation cache way that is selected for eviction is referred to as the "victim way" or "victim line". Since the victim way may be compacted, multiple replacement decisions can be made. If the victim way is not compacted, then the resident micro-operations of the victim way are evicted. If the victim way is compacted, then one approach for filling the new micro-operation group(s) to the victim way is to evict all compacted micro-operation groups in the victim way.

In the case when the micro-operation cache 235 maintains replacement state per group, a best-fit replacement algorithm can be employed. In the best-fit algorithm, the micro-operation cache finds the minimum sized micro-operation group in the victim way that can fit the new group of micro-operations. If evicting a single micro-operation group from the victim way frees up enough space for the new group of micro-operations, then the other N−1 micro-operation groups in the victim way remain intact.

In another implementation, a random-fit replacement algorithm can be employed by micro-operation cache 235. For the random-fit algorithm, after the primary replacement policy has been implemented and a victim way has been selected from the targeted set, the micro-operation cache 235 finds any micro-operation group whose eviction will enable the new group of micro-operations to be installed in the victim way. In case no single group of micro-operations in the victim way is large enough to make space for the new group of micro-operations, then the micro-operation cache 235 selects two or more groups of micro-operations to be evicted in order to enable the fill to happen. Alternatively, if multiple groups of micro-operations need to be replaced from the victim way, then the primary replacement policy can be implemented again to choose another way from the least-recently used (LRU) stack which is not compacted, thereby simplifying replacement and the associated fill algorithm.

It is noted that there are multiple approaches for identifying a candidate way to achieve compaction of a new group of micro-operations. In one implementation, prediction-window aware compaction can be utilized to identify a candidate way for compaction. For example, in this implementation, micro-operation cache 235 attempts to compact a new group of micro-operations with another group of micro-operations that belongs to the same prediction window or fetch window. As used herein, the term "prediction window" is defined as a number of bytes of instructions on the instruction path that is predicted by a branch predictor to be executed. Additionally, as used herein, the term "fetch window" is defined as a number of bytes that can be fetched in a single cycle. In one implementation, an entry in micro-operation cache 235 could have been terminated due to a maximum number of immediate/displacement fields values being reached. Then, the micro-operation cache 235 would start building the next entry which could get terminated by a taken branch. This would result in multiple micro-operation cache entries for the instructions of a single prediction window. In one implementation, micro-operation cache 235 can replace micro-operation groups from a compacted line that belong to a fetch window whose first micro-operation group has already been evicted.

In the case when replacement state is maintained per micro-operation group rather than per micro-operation cache line, N sets of LRU bits are stored per micro-operation cache line, assuming a maximum of N compacted groups of micro-operations per cache line. In this implementation, replacement state is updated based on the access patterns of each micro-operation group. Micro-operation groups can be selected for eviction individually based on their temporal reuse. However, if the new micro-operation group does not fit into the space occupied by the victim group of micro-operations, then one of the above-described secondary replacement policies (e.g., best-fit, random-fit) is used to select which groups of micro-operations or which cache line to replace. In one implementation, micro-operation compaction is also applied in the case of evictions from a virtualized micro-operation cache to the L1 instruction cache. In this implementation, compaction is enabled when allocating evicted groups of micro-operations from the micro-operation cache to the L1 instruction cache.

Figure 3:
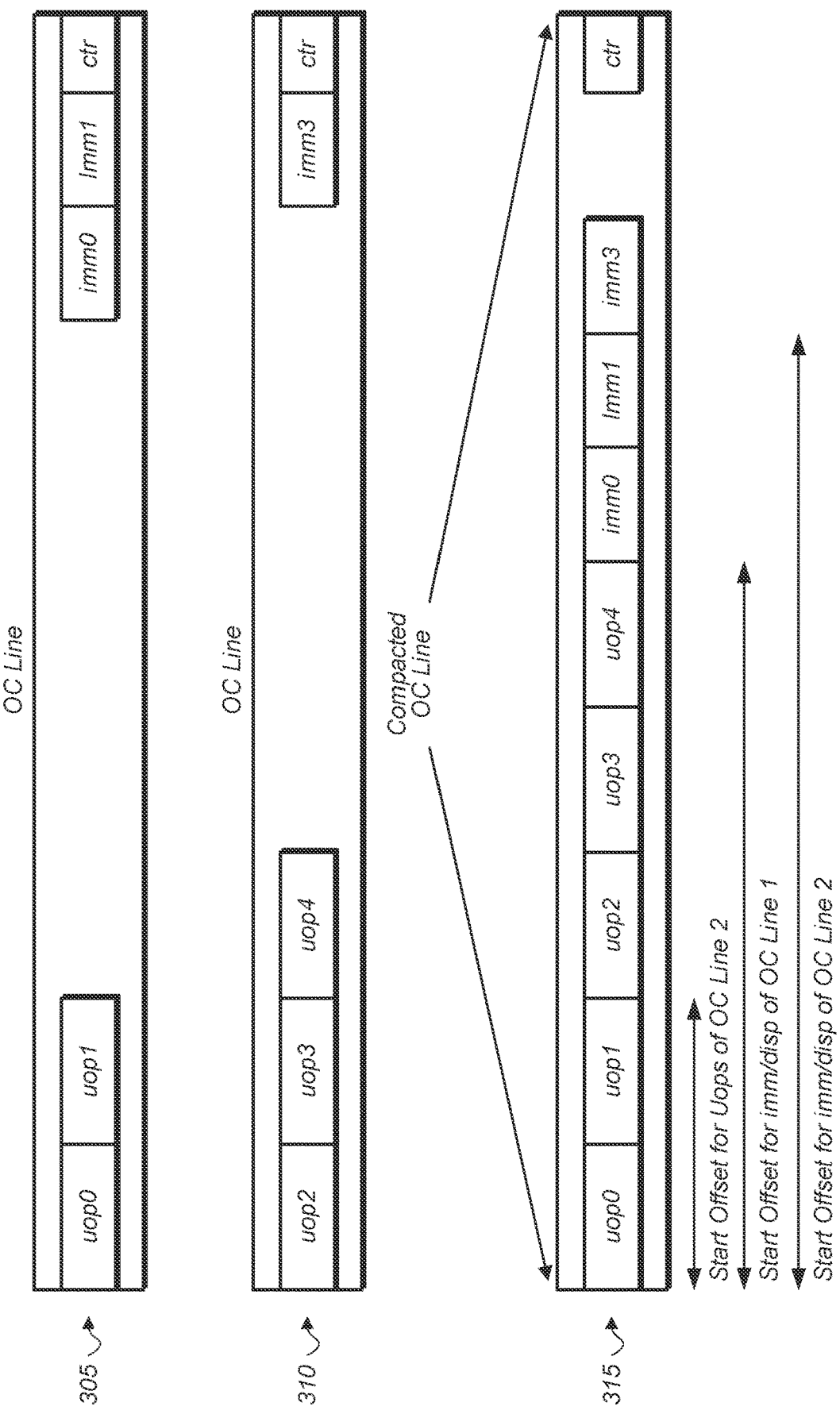
FIG. 3 is a block diagram of one implementation of compacting groups of micro-operations into a single cache line.

Referring now to FIG. 3, a block diagram of one implementation of compacting groups of micro-operations into a single cache line is shown. Micro-operation cache (OC) line 305 at the top of diagram illustrates an example of how a group of micro-operations (uops0-1) are stored in a cache line of a micro-operation cache (e.g., micro-operation cache 235 of FIG. 2). It is noted that a micro-operation cache can also be referred to within FIG. 3 by the acronym "OC". As can be seen from the diagram, there is a significant amount of unused space within micro-operation cache line 305. Another example of a micro-operation cache line is shown for OC line 310. It is noted that each micro-operation is abbreviated as a "uop" in FIG. 3.

In one implementation, rather than using the traditional approach of storing OC line 305 and OC line 310 as separate cache lines in the micro-operation cache, the group of micro-operations stored in OC line 305 and the group of micro-operations stored in OC line 310 are compacted together and stored as shown in compacted OC line 315. The first micro-operation group of OC line 305 consists of two micro-operations and the second micro-operation group of OC line 310 consists of three micro-operations. In this example, it is assumed that each micro-operation in the first group has an immediate field while in the second group, only micro-operation 3 has an immediate field (imm3).

In one implementation, OC line 315 includes the micro-operations of both groups stored in back-to-back locations followed by the immediate fields of both groups. In one implementation, metadata is used to track the start offset of the second group of micro-operations, the start byte of the immediate/displacement fields of the first group of micro-operations, and the start byte of the immediate/displacement fields of the second group of micro-operations. The micro-operations of the first group are expected to start from byte 0 of OC line 315. For micro-operation caches that support compaction, there are N sets of metadata, with one set per group of micro-operations that could potentially be stored in the same micro-operation cache line. A non-compacted group of micro-operations is stored in a micro-operation cache line in the same way as compacted groups. However, for a non-compacted group of micro-operations, the metadata for the other N−1 groups is set to 0, indicating that only one group is present.

Generally speaking, for N groups of micro-operations stored in a single cache line in the micro-operation cache, the N groups of micro-operations are addressed by their respective byte addresses, where N is a positive integer. When the micro-operation cache supports compaction, each micro-operation cache line includes tags for N groups. Accordingly, a micro-operation cache lookup involves accessing N×M tags for an M-way set associative micro-operation cache, where M is a positive integer.

Figure 4:
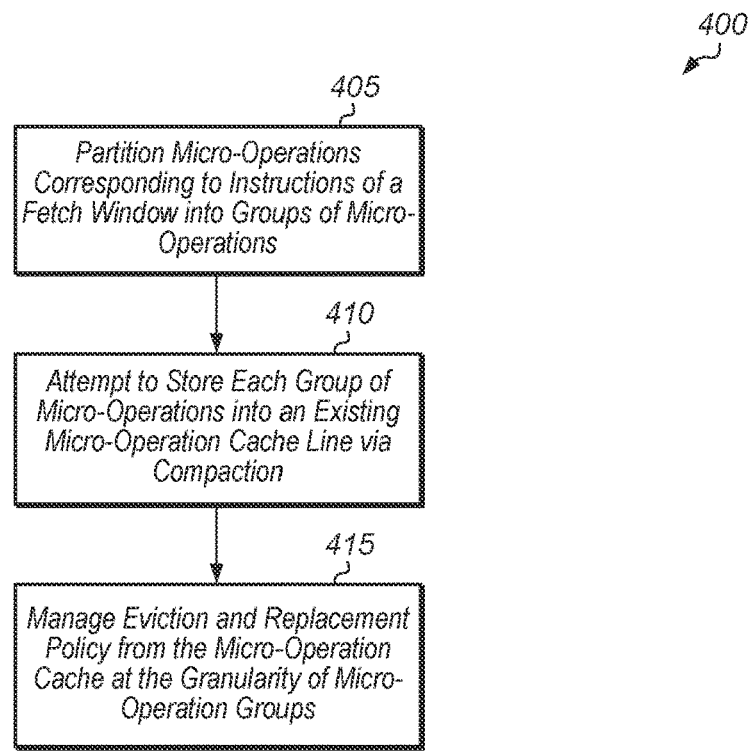
FIG. 4 is a generalized flow diagram illustrating one implementation of a method for compacting groups of micro-operations together into a single cache line of a micro-operation cache.
Figure 5:
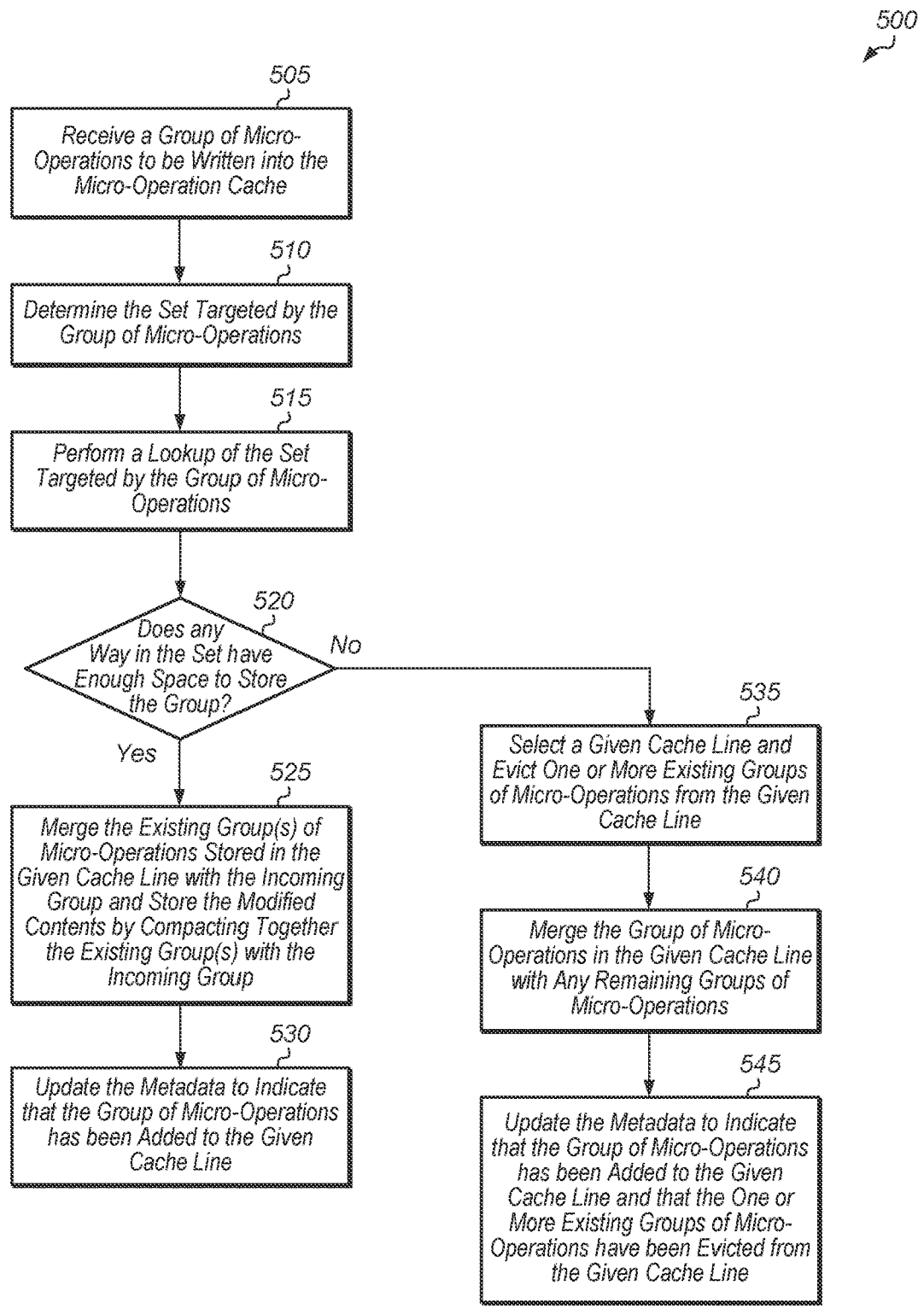
FIG. 5 is a generalized flow diagram illustrating one implementation of a method for performing a fill to a micro-operation cache.
Figure 6:
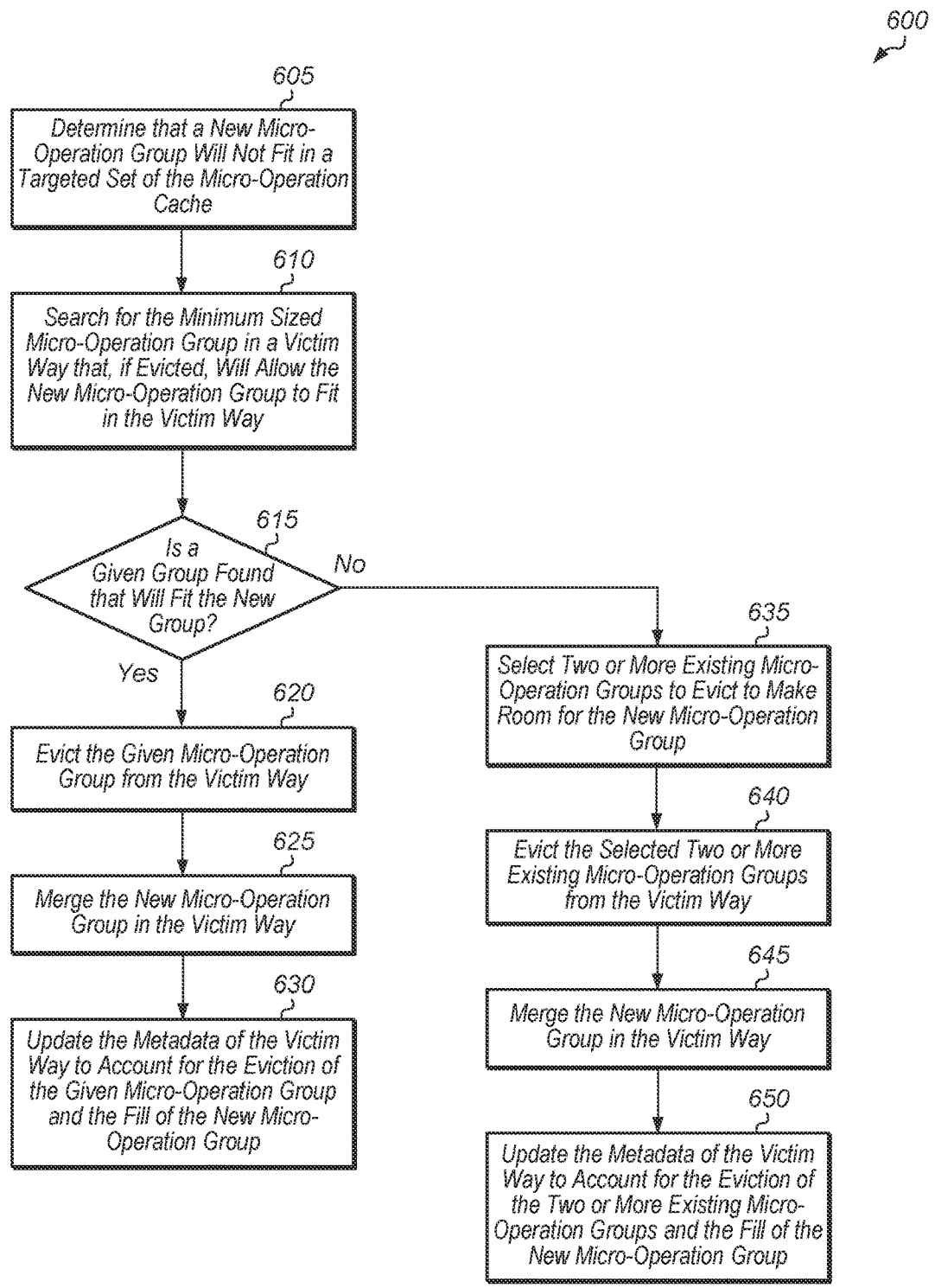
FIG. 6 is a generalized flow diagram illustrating one implementation of a method for implementing a replacement algorithm for a micro-operation cache that supports compaction.

Turning now to FIG. 4, one implementation of a method 400 for compacting groups of micro-operations together into a single cache line of a micro-operation cache is shown. For purposes of discussion, the steps in this implementation and those of FIGS. 5-6 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 400.

A processor partitions micro-operations corresponding to instructions of a fetch window into groups of micro-operations (block 405). In various implementations, the processor uses one or more criteria for determining how to partition the resulting micro-operations into separate groups during the decoding process. For example, in one implementation, the processor terminates a current group of micro-operations when a predicted taken branch is detected in the instructions. Also, in one implementation, the processor terminates a current group of micro-operations when a number of micro-operations in the current group reaches a threshold. Still further, in one implementation, the processor terminates a group of micro-operations upon reaching a threshold number of immediate or displacement values per group. In other implementations, the processor uses other conditions or factors to determine when to terminate a group of micro-operations.

Next, the processor attempts to store each group of micro-operations into an existing micro-operation cache line via compaction (block 410). In one implementation, the processor compacts an incoming group of micro-operations into an existing cache line in response to detecting one or more conditions. For example, a first condition is that an incoming group of micro-operations fits in the empty space of a single cache line of the micro-operation cache which already stores other groups of micro-operations. In an alternative embodiment, the incoming group or micro-operations and those in the existing cache line may be stored together in a new cache line. Additionally, a second condition is that the combined number of immediate or displacement fields of the pre-existing groups and the incoming group are less than or equal to a threshold number. In other implementations, other conditions can be used in block 410 to determine whether to compact an incoming group of micro-operations into a single cache line in the micro-operation cache that holds other groups of micro-operations.

Also, the processor manages eviction and replacement policy from the micro-operation cache at the granularity of micro-operation groups (block 415). In other words, the processor can choose to evict a subset of the groups of micro-operations stored in a single cache line if the incoming group of micro-operations can fit into the space evacuated by the subset of the groups of micro-operations. After block 415, method 400 ends. It is noted that in one implementation, the compaction of micro-operations described in method 400 is performed in response to a micro-operation cache miss occurring.

Referring now to FIG. 5, one implementation of a method 500 for performing a fill to a micro-operation cache is shown. A micro-operation cache receives a group of micro-operations to be written into the micro-operation cache (block 505). The micro-operation cache determines the set targeted by the group of micro-operations (block 510). In one implementation, the micro-operation cache uses a fetch address of the given instruction(s) from which the group of micro-operations were decoded to determine the set targeted by the group of micro-operations. Next, the micro-operation cache performs a lookup of the set targeted by the group of micro-operations (block 515). Then, the micro-operation cache determines if any way in the set has enough unused space to store the group of micro-operations without causing an eviction (conditional block 520).

If a given cache line in the set is able to store the group of micro-operations without causing an eviction (conditional block 520, "yes" leg), then the micro-operation cache merges the existing group(s) of micro-operations stored in the given cache line with the incoming group and stores the modified contents by compacting together the existing group(s) with the incoming group of micro-operations (block 525). Also, the micro-operation cache updates the metadata to indicate that the group of micro-operations has been added to the given cache line (block 530). In one implementation, the metadata includes a start offset of each group of micro-operations (other than the first group) within the given cache line and a start offset for the immediate/displacement fields of each group. In other implementations, the metadata includes other information. After block 530, method 500 ends.

If none of the existing cache lines of the set are able to store the group of micro-operations without causing an eviction (conditional block 520, "no" leg), then the micro-operation cache selects a given cache line and evicts one or more existing groups of micro-operations from the given cache line (block 535). Next, the micro-operation cache merges the incoming group of micro-operations in the given cache line with any remaining groups of micro-operations (block 540). Then, the micro-operation cache updates the metadata to indicate that the group of micro-operations has been added to the given cache line and that the one or more existing groups of micro-operations have been evicted from the given cache line (block 545). After block 545, method 500 ends.

Turning now to FIG. 6, one implementation of a method 600 for implementing a replacement algorithm for a micro-operation cache that supports compaction is shown. A micro-operation cache that supports compaction determines that a new micro-operation group will not fit in any way of a targeted set of the micro-operation cache (block 605). In response, the micro-operation cache searches for the minimum sized micro-operation group in a victim way that, if evicted, will allow the new micro-operation group to fit in the victim way (block 610). Alternatively, in another implementation, the micro-operation cache searches for any micro-operation group whose eviction will enable the new micro-operation group to be installed in the victim way in block 610. If a given micro-operation group is found such that its eviction will allow the new micro-operation group to be stored in the victim way (conditional block 615, "yes" leg), then the given micro-operation group is evicted from the victim way (block 620). In some cases, the evicted given micro-operation group is written to the L1 instruction cache. In one implementation, the L1 instruction cache also supports compacting groups of micro-operations in individual cache lines. In this implementation, the evicted given micro-operation group can be compacted with the existing micro-operation groups of a cache line of the L1 instruction cache. Alternatively, in another implementation, the evicted given micro-operation group is discarded. Next, the new micro-operation group is merged in the victim way (block 625). Then, the metadata of the victim way is updated to account for the eviction of the given micro-operation group and the fill of the new micro-operation group (block 630). After block 630, method 600 ends.

If a given micro-operation group cannot be found such that its eviction will allow the new micro-operation group to be stored in the victim way (conditional block 615, "no" leg), then the micro-operation cache selects two or more existing micro-operation groups to evict to make room for the new micro-operation group (block 635). In some cases, an entire cache line will be evicted from the micro-operation cache in block 635. Next, the selected two or more existing micro-operation groups are evicted from the victim way of the micro-operation cache (block 640). In some cases, the evicted two or more existing micro-operation groups are written to the L1 instruction cache. Then, the new micro-operation group is merged in the victim way (block 645). Next, the metadata for the victim way is updated to account for the eviction of the two or more existing micro-operation groups and the fill of the new micro-operation group (block 650). After block 650, method 600 ends.

Figure 7:
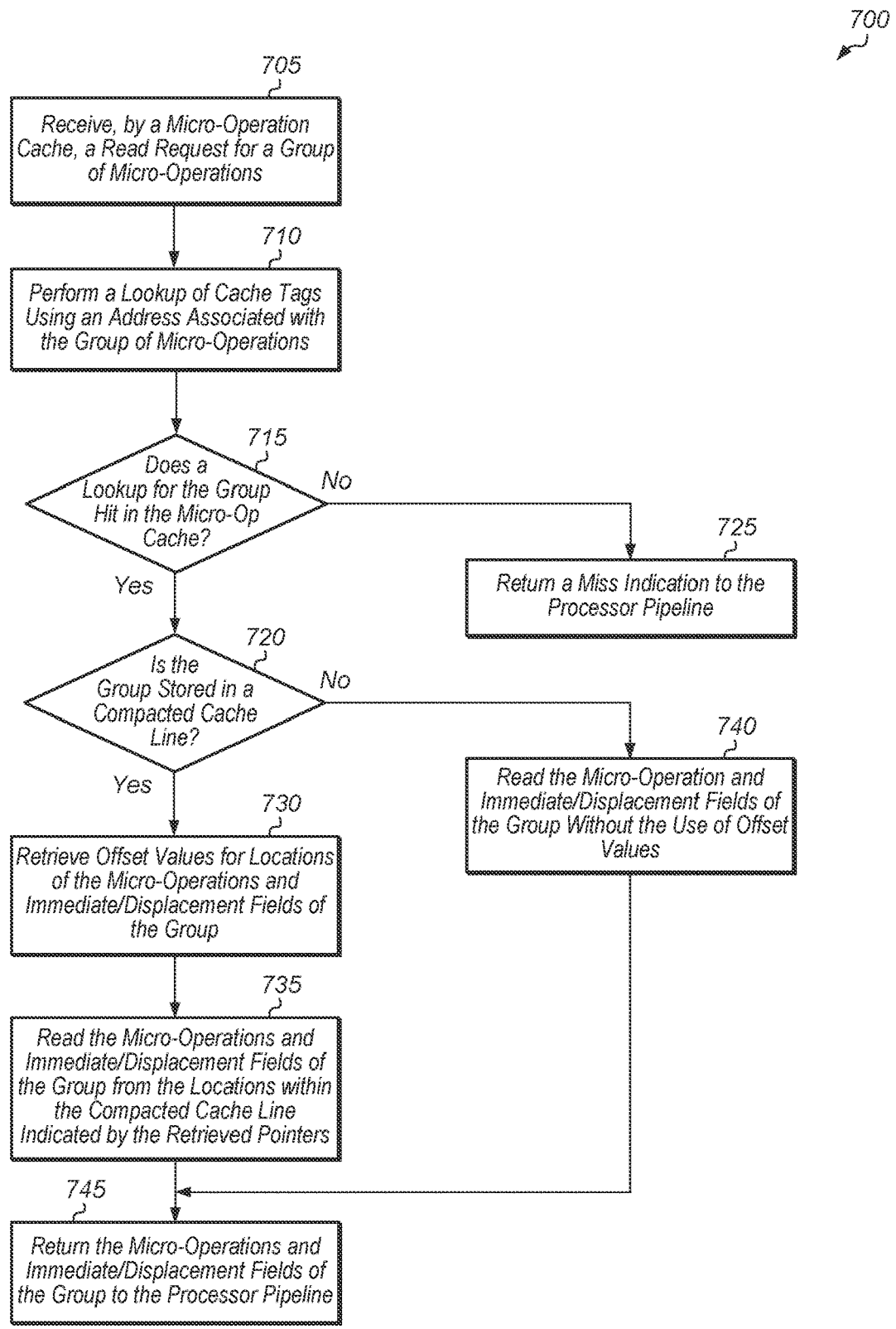
FIG. 7 is a generalized flow diagram illustrating one implementation of a method for retrieving a group of micro-operations from a micro-operation cache.

Referring now to FIG. 7, one implementation of a method 700 for retrieving a group of micro-operations from a micro-operation cache is shown. A micro-operation cache receives a read request for a group of micro-operations (block 705). In response to receiving the read request, the micro-operation cache performs a lookup of cache tags using an address associated with the group of micro-operations (block 710). If the lookup for the group hits in the micro-operation cache (conditional block 715, "yes" leg), then the micro-operation cache determines if the group of micro-operations is stored in a compacted or non-compacted cache line (conditional block 720). If the lookup for the group misses in the micro-operation cache (conditional block 715, "no" leg), then the micro-operation cache returns a miss indication to the processor pipeline (block 725). After block 725, method 700 ends.

If the micro-operation cache determines that the group of micro-operations is stored in a compacted cache line (conditional block 720, "yes" leg), then the micro-operation cache retrieves offset values for locations of the micro-operations and immediate/displacement fields of the group (block 730). It is noted that if the group is the first group stored in the compacted cache line, then it is assumed that the micro-operations are stored from the beginning of the cache line, and an offset value does not need to be retrieved in this case. However, the offset for the immediate/displacement fields would still be retrieved for the first group of micro-operations in the cache line. Next, the micro-operation cache reads the micro-operations and immediate/displacement fields of the group from the locations within the cache line indicated by the retrieved pointers (block 735). Then, the micro-operation cache returns the micro-operations and immediate/displacement fields of the group to the processor pipeline (block 745).

On the other hand, if the micro-operation cache determines that the group of micro-operations is stored in a non-compacted cache line (conditional block 720, "no" leg), then the micro-operation cache reads the micro-operations and immediate/displacement fields of the group without the use of offset values (block 740). Next, the micro-operation cache returns the micro-operations and immediate/displacement fields of the group to the processor pipeline (block 745). After block 745, method 700 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor, comprising:
a decode unit comprising circuitry configured to decode instructions from an instruction stream into a first group of micro-operations; and
a micro-operation cache comprising circuitry configured to:
identify a victim compacted cache line for storing the first group of micro-operations; and
evict at least one micro-operation, but fewer than all micro-operations, from the victim compacted cache line.

2. The processor as recited in claim 1, wherein to identify the victim compacted cache line for storing the first group of micro-operations, the micro-operation cache is further configured to determine an existing compacted cache line comprising one or more micro-operations is not available that has sufficient space to store the first group of micro-operations.

3. The processor as recited in claim 1, wherein to evict the at least one micro-operation from the victim compacted cache line, the micro-operation cache is configured to evict fewer than all micro-operations from the victim compacted cache line to form sufficient space to store the first group of micro-operations.

4. The processor as recited in claim 1, wherein to identify the victim compacted cache line for storing the first group of micro-operations, the micro-operation cache is configured to determine a targeted set of the micro-operation cache includes a victim way that has a second group of micro-operations that when evicted provides sufficient space to store the first group of micro-operations.

5. The processor as recited in claim 1, wherein the micro-operation cache is further configured to determine that evicting the at least one micro-operation will provide sufficient space to store the first group of micro-operations.

6. The processor as recited in claim 1, wherein the micro-operation cache is further configured to:
merge the first group of instructions in the victim compacted cache line with at least one additional micro-operation in the victim compacted cache line.

7. The processor as recited in claim 4, wherein the micro-operation cache is further configured to update metadata of the victim way to account for eviction of the second group of micro-operations and fill of the first group of micro-operations.

8. A method, comprising:
decoding, by decode unit circuitry, instructions from an instruction stream into a first group of micro-operations;
identifying, by a micro-operation cache, a victim compacted cache line for storing the first group of micro-operations; and
evicting, by the micro-operation cache, at least one micro-operation, but fewer than all micro-operations, from the victim compacted cache line.

9. The method as recited in claim 8, wherein identifying the victim compacted cache line for storing the first group of micro-operations comprises determining an existing compacted cache line comprising one or more micro-operations is not available that has sufficient space to store the first group of micro-operations.

10. The method as recited in claim 8, wherein evicting the at least one micro-operation from the victim compacted cache line comprises evicting the at least one micro-operation, but fewer than all micro-operations, from the victim compacted cache line to form sufficient space to store the first group of micro-operations.

11. The method as recited in claim 8, wherein identifying the victim compacted cache line for storing the first group of micro-operations comprises:
determining, by the micro-operation cache, a targeted set of the micro-operation cache includes a victim way that has a second group of micro-operations that when evicted provides sufficient space to store the first group of micro-operations, wherein the victim way is the victim compacted cache line.

12. The method as recited in claim 8, further comprising merging the first group of micro-operations with at least one other micro-operation in a given compacted cache line of the micro-operation cache.

13. The method as recited in claim 11, further comprising:
evicting, by the micro-operation cache, the second group of instructions from the victim way; and
merging, by the micro-operation cache, the first group of instructions in the victim way to store the first group of instructions and at least one additional micro-operation in the victim way.

14. The method as recited in claim 12, further comprising updating, by the micro-operation cache, metadata of the given compacted cache line to identify both the first group of micro-operations and the at least one other micro-operation.

15. A system, comprising:
a memory; and
a processor coupled to the memory;
wherein the processor comprises circuitry configured to:
receive an instruction stream from the memory;
decode instructions from the instruction stream into a first group of micro-operations;
identify a victim compacted cache line for storing the first group of micro-operations; and evict at least one micro-operation, but fewer than all micro-operations, from the victim compacted cache line.

16. The system as recited in claim 15, wherein to identify the victim compacted cache line for storing the first group of micro-operations, the processor is further configured to determine an existing compacted cache line comprising one or more micro-operations is not available that has sufficient space to store the first group of micro-operations.

17. The system as recited in claim 15, wherein to evict the at least one micro-operation from the victim compacted cache line, the processor is further configured to evict the at least one micro-operation, but fewer than all micro-operations, from the victim compacted cache line to form sufficient space to store the first group of micro-operations.

18. The system as recited in claim 15, wherein to identify the victim compacted cache line for storing the first group of micro-operations, the processor is further configured to:

determine a targeted set that includes a victim way that has a second group of micro-operations that when evicted provides sufficient space to store the first group of micro-operations, wherein the victim way is the victim compacted cache line.

19. The system as recited in claim 18, wherein the processor is further configured to determine the second group of instructions is a minimum sized group of instructions in the targeted set that when evicted provides sufficient space to store the first group of micro-operations.

20. The system as recited in claim 18, wherein the processor is further configured to:

evict the second group of instructions from the victim way; and merge the first group of instructions in the victim way to store the first group of instructions and at least one additional micro-operation in the victim way.

\* \* \* \* \*